United States Patent
Tanaka et al.

(10) Patent No.: US 6,502,167 B1
(45) Date of Patent: Dec. 31, 2002

(54) DUPLICATED SHARED MEMORY CONTROLLER FOR DISK ARRAY

(75) Inventors: Atsushi Tanaka, Urawa (JP); Akira Fujibayashi, Kokubunji (JP); Kazuhisa Fujimoto, Kokubunji (JP); Hiroki Kanai, Higashiyamato (JP); Nobuyuki Minowa, Odawara (JP); Hikari Mikami, Odawara (JP); Makoto Asari, Yokohama (JP)

(73) Assignees: Hitachi, Ltd., Tokyo (JP); Hitachi Software Engineering Co., Ltd., Yokohama (JP); Hitachi Video and Information System, Inc., Kanagawa (JP)

( * ) Notice: Subject to any disclaimer, the term of this patent is extended or adjusted under 35 U.S.C. 154(b) by 0 days.

(21) Appl. No.: 09/526,461

(22) Filed: Mar. 16, 2000

(30) Foreign Application Priority Data

Mar. 17, 1999 (JP) ............................................. 11-071400

(51) Int. Cl.⁷ ............................................. G06F 12/00
(52) U.S. Cl. ............................. 711/114; 711/4; 711/147; 711/148; 710/38; 710/39; 710/110; 710/129; 710/131
(58) Field of Search .................................. 711/147, 148, 711/149, 120, 114, 4, 118; 709/209, 213; 710/21, 38, 110, 131, 129, 39

(56) References Cited

U.S. PATENT DOCUMENTS

| | | | | |
|---|---|---|---|---|
| 5,572,694 A | * | 11/1996 | Uchino | 395/406 |
| 5,878,204 A | * | 3/1999 | Kobayashi et al. | 395/182.07 |
| 5,890,219 A | * | 3/1999 | Scaringella et al. | 711/162 |
| 6,092,216 A | * | 7/2000 | Kobayashi et al. | 714/9 |

FOREIGN PATENT DOCUMENTS

| | | |
|---|---|---|
| JP | 58-16362 | 1/1983 |
| JP | 9-146863 | 6/1997 |
| JP | 9-325916 | 12/1997 |

* cited by examiner

Primary Examiner—Do Hyun Yoo
Assistant Examiner—Jasmine Song
(74) Attorney, Agent, or Firm—Mattingly, Stanger & Malur, P.C.

(57) ABSTRACT

The disk array controller includes a plurality of interfaces with respective processors for connecting with a host computer or disk devices, duplicated shared memories connected in a one to one ratio between each interface and respective access paths, a selector connected to the plurality of interfaces, and a cache memory connected to the selector. The number of access paths between the selector and the plurality of interfaces is greater than the number of access paths between the cache memory and the selector. Each processor performs dual writing in the duplicated shared memories.

9 Claims, 21 Drawing Sheets

Path Lock Table

| Side of Shared Memory | Occupied Path# | Path Queue Length | Dual Access in Queue | Current Access | Current Access is Locked | Current Access has Master/ Slave |
|---|---|---|---|---|---|---|
| A | 60 | 2 | Dual Atomic Modify | Single Read | No | No |
| A | 65 | 0 | No | Single Write | No | No |
| B | 70 | 3 | No | Dual Write | Yes | Master |
| B | 75 | 2 | No | Atomic Modify (Read) | Yes | No |

Fig. 5

Memory Lock Table

| Occupied Path# | Exclusive Processing Start Address | Exclusive Processing End Address | Lock Access |
|---|---|---|---|
| 60 | 0xA00..07 | 0XA00..0F | Master |
| 61 | 0xB00..FF | 0xC00..FF | Atomic Modify |
| 62 | 0xC00..20 | 0xC00..27 | |
| | | | |
| 8 | 0xD00..30 | 0xD00..40 | Atomic Modify |

Fig. 6

Fig. 13  command termination processing  760

| current access | lock of current access | master/slave of current access | next processing |
|---|---|---|---|
| single read | No | No | release path. delete entry of transaction in Path Lock Table. generate data, status and report to CPU |
| sigle write | No | No | release path. delete entry of transaction in Path Lock Table. generate status and report to CPU |
| dual write | Yes | Master | lock path. send write command to slave side. and wait for slave side processing |
| dual write | Yes | Slave | release master & slave path delete entry of transaction in Path Lock Table. generate status and report to CPU |
| single atomic modify (read) | Yes | No | lock path. generate data, status and report to CPU. change the entry to write command in Path Lock Table. and generate write command after modify. |
| single atomic modify (write) | Yes | No | release path delete entry of transaction in Path Lock Table. generate status and report to CPU |
| dual atomic modify(read) | Yes | No | lock path. generate data, status and report to CPU. change the entry to write command in Path Lock Table. and generate write commands after modify. |
| dual atomic modify(write) | Yes | Master | lock path wait for slave side processing |
| dual atomic modify(write) | Yes | Slave | release path delete entry of transaction in Path Lock Table. generate status and report to CPU |

DUPLICATED SHARED MEMORY CONTROLLER FOR DISK ARRAY

BACKGROUND OF THE INVENTION

1. Field of the Invention

The present invention relates to a disk array controller comprising a plurality of central processing units (CPUs) for controlling the interface between a host computer or disk device(s), and a plurality of memories for storing the control data.

2. Description of Related Art

A structure of a disk array controller of the conventional art utilizing a shared memory multiprocessor system is shown in FIG. 21. In the controller shown in FIG. 21, a plurality of CPU-PK (packages) 2101, a shared memory package (SM-PK) #A 2103 equipped with the shared memory for storing control data, and a shared memory package (SM-PK) #B 2104 are connected by way of the shared memory path 2102. Each CPU-PK is connected to either the host computer or the disk device. Each CPU-PK contains a plurality of CPUs and each CPU performs transfer of data from the host computer or disk device, or controls the transfer of data to the host computer or disk device by utilizing the control data stored in the shared memory.

The memory controller of the conventional art has a plurality of paths connecting between a plurality of central processing units (CPU) and memories in order to shorten the response time for memory access and increase the number of processable transactions. In order to increase the number of processable transactions, the processable transactions must be optimally distributed along the plurality of paths. A technology for distributing the transactions is disclosed in Japanese Published Unexamined Patent Application No. 9-146863 for distributing transactions by checking flags indicating the use or non-use of a path.

Another method is known in the memory controller of the conventional art for improving reliability by duplication of paths and duplication of the memory. Such a memory controller device is for instance, disclosed in Japanese Published Unexamined Patent Application No. 9-325916 and utilizes two paths for memory access to increase the number of processable transactions and at the same time increase reliability of the data by dual writing of important data onto two memories. In this kind of method however, in order to write the same data on a plurality of non-synchronous memories, problems such as data mismatches or deadlocks may occur when simultaneously attempting a plurality of dual writing. In this kind of dual write, simplifying of the access paths and elimination of the data mismatch or deadlock problems was attempted by establishing fixed buses for use by each memory address.

However, in this method, the response time during serial processing on the bus becomes a problem when multiple accesses occur, and performance bottlenecks relating to the number of processable transactions are also a disadvantage. Also, in spite of the duplication of buses, all the connected central processing units (CPU) are affected when a problem occurs on a bus.

In an attempt to improve both performance and reliability, the star connection which connects the CPU and memory in a ratio of one to one was contrived. In the method disclosed in Japanese Published Unexamined Patent Application No. 58-16362 each duplicated memory from each CPU is connected by one bus line each. In this method, an increased number of paths can be simultaneously accessed compared to the above methods, and the number of processable transactions can be further increased. Each CPU is connected to a path so that compared to the above methods, the range of CPU likely to be affected by a problem on one path is limited and the reliability is also high. Still further in this technology, interfaces are provided between the shared memories in order to avoid problems during dual write processing such as deadlocks or data mismatches.

BRIEF SUMMARY OF THE INVENTION

The shared memory in the disk array controller does not require data transfer in as large amounts as the cache memory, however increasing the number of transactions and shortening the response time for each data transfer is necessary. A one-to-one connection between each CPU and the shared memory is therefore suitable as disclosed in the technology of Japanese Published Unexamined Patent Application No. 58-16362.

The transfer of large quantities of data at high speed however, is necessary between each CPU and cache memory so that increasing the number of access paths is required. Establishing connections in a ratio of one to one between each CPU and memory is therefore a suitable method as disclosed in Japanese Published Unexamined Patent Application No. 58-16362.

However, as previously mentioned, there is a physical limit on how many connectors can be mounted on the package comprising the cache memory or how many pins can be mounted on the LSI comprising each memory. This physical limit on the amount of hardware also limits an increase in the number of access paths that can be installed between each CPU and shared memory.

As mentioned above, the star connection method is an excellent bus connection method for increasing the number of processable transactions and improving reliability. The technology disclosed in Japanese Published Unexamined Patent Application No. 58-16362 however has the disadvantage that since an interface connects with the shared memory for dual write, the entire shared memory becomes unusable in the event a problem occurs on this interface. Also, since both of the shared memories lock up during dual write, other access is refused, creating the problem that the number of processable transactions decreases. Further, even if simply increasing the number of paths is attempted, serial processing of dual write must be performed just as with the previously related method, so that a significant increase in the number of transactions cannot be achieved. One path connects between each CPU and shared memory so that accessing data might become impossible if a problem occurs on that path.

Whereupon, it is therefore an object of this invention to provide a disk array controller having a shorter memory access response time between a plurality of CPUs and duplicated memories, and further capable of an increased number of processable transactions.

Another object of this invention is to provide a selection control means to select a path that will not cause data mismatches or deadlocks during dual write.

In order to resolve the above mentioned problems, this invention is installed with a path lock table to indicate the usage status of each path on the shared memory path interface for connecting and controlling the CPU and each memory path, and is further installed with a memory lock table indicating memory lock information for the shared memory control circuit for connecting and controlling the shared memory and each memory path. In processing (single read, single write, atomic modify) for other than dual write, the number of waiting transactions (transactions awaiting processing) on each path is shown, and a path with a short path queue length selected. In processing for dual write and dual write atomic modify, the path lock table is referred to when selecting the path, and if the number of dual write transactions already being processed is less than a fixed number, then dual write processing starts, and if greater than a fixed number, then dual write processing sets to standby. Further, when selecting a path for dual write, paths are selected that are different from those paths where dual write processing is already being performed.

BRIEF DESCRIPTION OF THE SEVERAL VIEWS OF THE DRAWINGS

FIG. 5 shows an example of the path lock table of the disk array controller of this invention.

FIG. 6 shows an example of the memory lock table of the disk array controller of this invention.

FIG. 13 is a table showing the command termination processing in the disk array controller of this invention.

DETAILED DESCRIPTION OF THE INVENTION

The embodiments of this invention are hereafter described while referring to the accompanying drawings.

Figure 1:
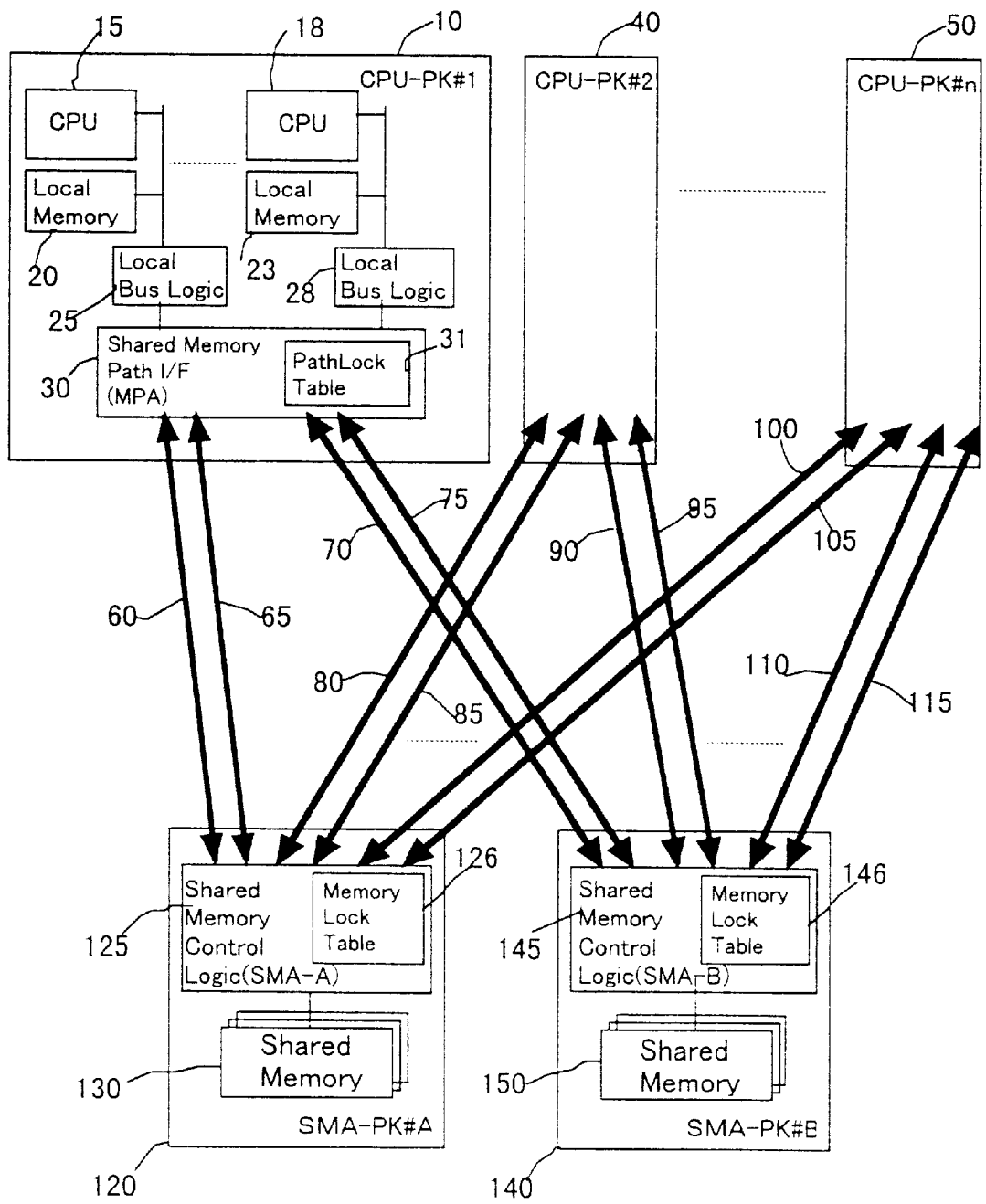
FIG. 1 shows a block diagram of the overall structure of the disk array controller of this invention.
Figure 2:
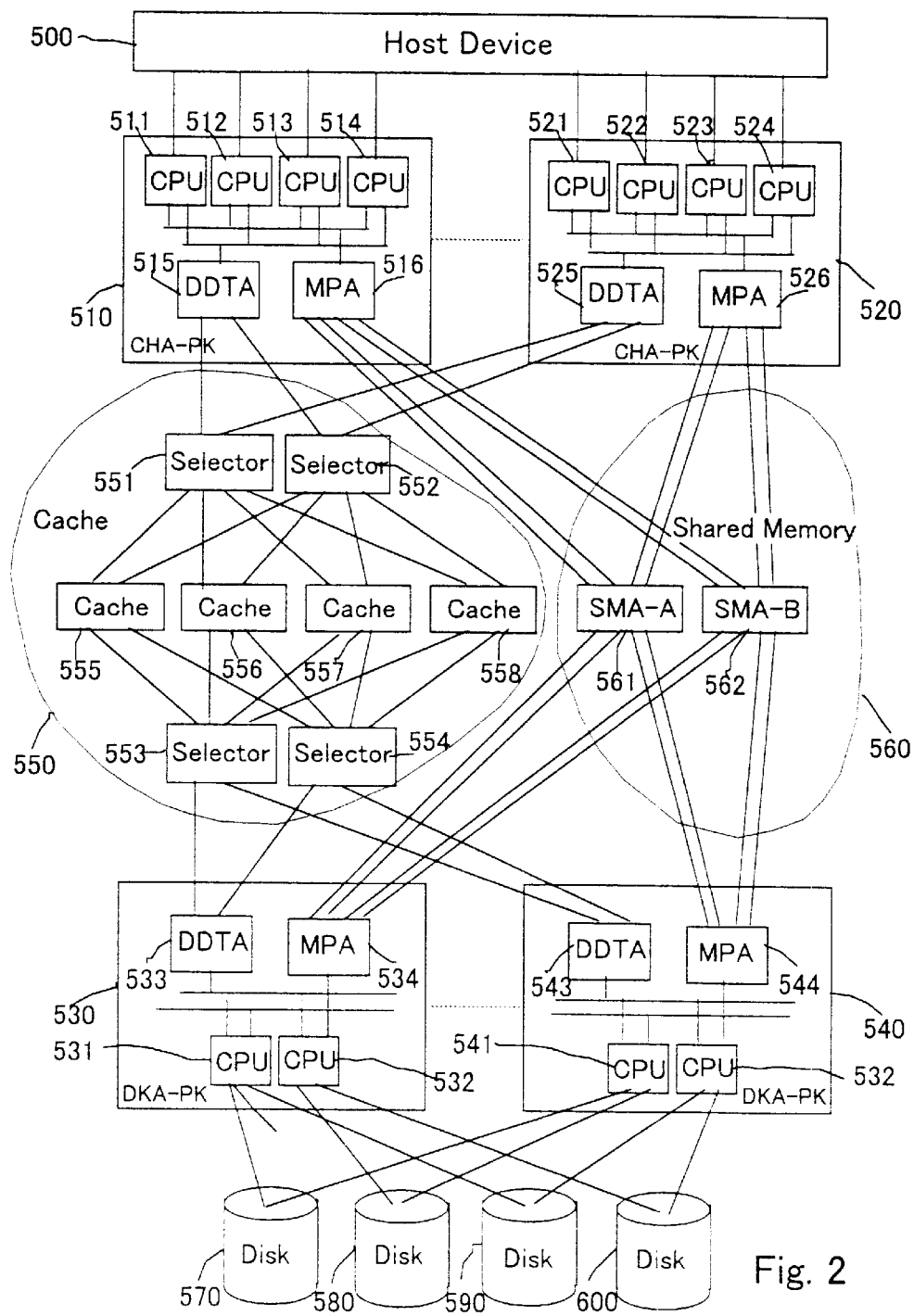
FIG. 2 shows a block diagram of the overall structure of the disk array controller of this invention.

The overall structure of the disk array controller is first described by utilizing the example in FIG. 2. A disk array controller 610 is connected to a host device 500 and a magnetic disk 570, 580, etc. The reference numeral 500 denotes a host device (host) and is typically a general-purpose computer, work station or personal computer that issues read or write commands to a secondary storage device and receives the results. Reference numerals CHA-PK510 and 520 denote a channel adapter package, to receive commands from the host device 500 and access a cache 550, a shared memory 560 and the DKA-PK530, 540. A DKA-PK530 and 540 are disk adapter packages that access the magnetic disks 570, 580, 590, 600 by commands from the shared memory 560 or the CHA-PK510, 520. The CHA-PK510, 520, and the DKA-PK530, 540 here have the same structure as in the CPU-PK10 of FIG. 1, etc. The reference numerals 511, 512, 513, 514, 521, 522, 523, 524, 533, 534, 543, 544 are CPU that control each package. The DDTA 515, 525, 533, 543 perform transmission and reception of data between the upper host device 500 or the magnetic disks 570, 580, 590, 600 and the cache 550. The MPA516, 526, 534, 544 control the exchange of shared data between each CPU and the shared memory 560. The cache memory 550 temporarily stores the data of the upper host device 500 or the magnetic disks 570, 580, 590, 600. The selectors 551, 552, 553, 554 control the connections between the DDTA 515, 525, 533, 543 and the caches 555, 556, 557, 558. The reference numerals 555, 556, 557, 558 denote caches that are control circuits and memories to store the data coming from each selector. The reference numeral 560 is a cache memory for storing control data for response with the host device 500 and data access with the cache 550, and the magnetic disks 570, 580, 590, 600. Reference numerals 561, 562 are SMA-A, B which are a control circuit and memory for storing the control data coming from each MPA. Here, the SMA-A561 and the SMA-B562 have the same structure as the SMA-PK#A120 and the SMA-PK#B140 of FIG. 1. Reference numerals 570, 580, 590, 600 are magnetic disks that store data and if necessary load data in the cache 550.

A large amount of data must be transferred at high speed between the DDTA515, 525 and the caches 555 and 556 so the number of access paths between the DDTA515, 525 and the caches 555, 556 must be increased. One to one connections between the DDTA515, 525 and the caches 555, 556 are a suitable means for increasing the number of access paths. However, since there is a physical limit on the number of connectors that can be mounted in the packages comprising the caches 555, 556 and on the number of pins that can be mounted on the LSI comprising the cache 113, a corresponding restriction also exists on increases in the number of access paths between the DDTA515, 525 and the caches 555, 556.

Selectors 551 and 552 were therefore installed between the DDTA 515, 525 and the caches 555, 556, and by establishing connections in a one to one ratio between the DDTA 515, 525 and the selectors 551 and 552, the number of access paths between the DDTA 515, 525 and the selectors 551 and 552 was increased. In the selectors 551 and 552 on the other hand, by limiting access requests from the plurality of DDTA 515, 525 to a specific number in the selectors 551, 552, the number of access paths between the caches 555, 556 and the selectors 551, 552 can be reduced to a smaller number of access paths than between the DDTA 515, 525 and caches 555, 556 so that the above mentioned problem with the number of connectors and the number of pins can be resolved.

The shared memory on the other hand, unlike the cache memory, does not require the transfer of large quantities of data, however increasing the number of transactions and shortening the response time for each transfer is necessary. Therefore, the selector was eliminated in order to avoid selector delays in the connections between the SMA-A561, SMA-B562 and each CPU-PK. Selectors can however be installed between the MPA and the SMA-A, SMA-B.

In the following description, the cache memories are omitted in the block diagram of the disk array controller.

First Embodiment

FIG. 1 is a block diagram showing the overall structure of the disk array controller of this invention.

The reference numerals 10, 40, 50 in FIG. 1, are CPU packages (CPU-PK#1, #2, #3) comprised of a plurality of CPU and memories, etc. The reference numerals 15, 18 are CPU for implementing read, write, processing and commands on each memory. Reference numerals 20, 23 are local memories that store information and programs required by each CPU. Reference numerals 25, 28 are local bus logic circuits connecting to the CPU 15, the local memory 20 and the shared memory interface 30 for controlling the mutual exchange of data. Reference numeral 30 is a shared memory path interface (MPA) connecting between and controlling the data exchange between the CPU15, 18 and the shared memory paths (60 to 115). The shared memory path interface 30 contains an internal path lock table used when performing exclusive processing and path selection. The reference numerals 60, 65, 70, 75, 80, 85, 90, 95, 100, 105, 110, 115 are shared memory paths utilized to send data between the CPU 15, 18 and the shared memories 130, 150. Reference numeral 120 denotes an SMA-PK#A, and 140 is an SMA-PK#B which are control circuits and memories for storing control data coming from each MPA. The SMA-PK#A120 and SMA-PK#B140 together form a duplicated complementary section of the memory. Reference numeral 125 is a shared memory control logic circuit A (SMA-A), and 145 is a shared memory control logic circuit B (SMA-B) for processing shared memory access from each CPU package. Reference numerals 126, 146 are memory lock tables for controlling the lock information of the shared memory. Reference numerals 130, 150 are shared memories for storing control data shared between each CPU.

Figure 3:
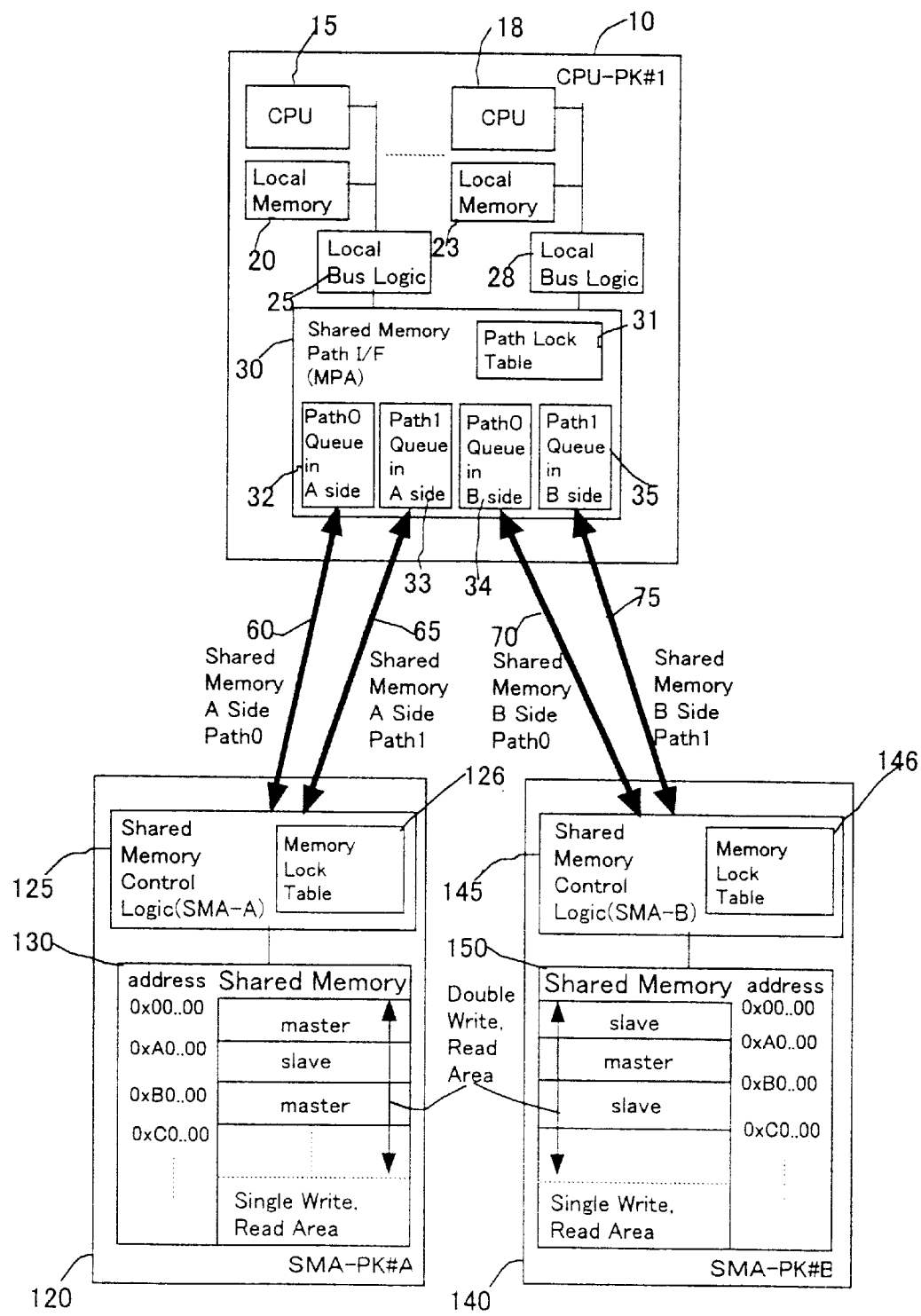
FIG. 3 shows a block diagram of the basic structure of the disk array controller of this invention.

FIG. 3 is a block diagram showing the structure of FIG. 1 in more detail.

Besides the path lock table 31 inside the shared memory interface (MPA) in the CPU-PK#1, cues are also present for registering waiting transactions (transactions awaiting processing) on each path. In FIG. 3, the reference numeral 32 is a Path0 queue on the A side, 33 is a Path1 queue on the A side, 34 is a path0 queue on the B side, and 35 is a Path1 queue on the B side. The MPA30 sends the transaction along the paths according to the order in which these cues are arrayed. The number of waiting transactions (transactions awaiting processing) in these queues is counted as the path queue length, and this path queue length is registered in the path lock table 31. The types of access currently being processed and the number of dual access transactions inside the cue are also recorded in the path lock table 31. There are two paths each from the CPU-PK10 to the SMA-PK120, 140 so that a maximum of four access transactions can be processed simultaneously. The shared memory control logic (circuit) A125, and the shared memory control logic (circuits) A145 receive access requests from each path, decide the order of priority and then access the shared memories 130, 150. The address currently being accessed is stored in the memory lock table at this time and other access requests are excluded even if requested after that address. In the case of dual write, the first access written from among the A side of shared memory 130 and B side of shared memory 150 is set as the master and the subsequently written access is set as the slave. This master/slave order can be interchanged by means of the data address set by the user. In the example in FIG. 3, when the A side from 0x00..000 to 0xA0..000 is set as the master side, the A side next becomes the slave side until the next 0xB0..000. At that time, the B side from 0x00..000 to 0xA0..000 is the slave side, and then becomes the master side until the next 0xB0..000.

This method under various conditions, allows performing parallel dual-write processing that has been performed serially in the conventional art. The example in FIG. 3 only showed dual write and read areas however different addresses can be distributed on the A side and B side in the case of single write and read areas, so that no master/slave settings are made.

Figure 4A:
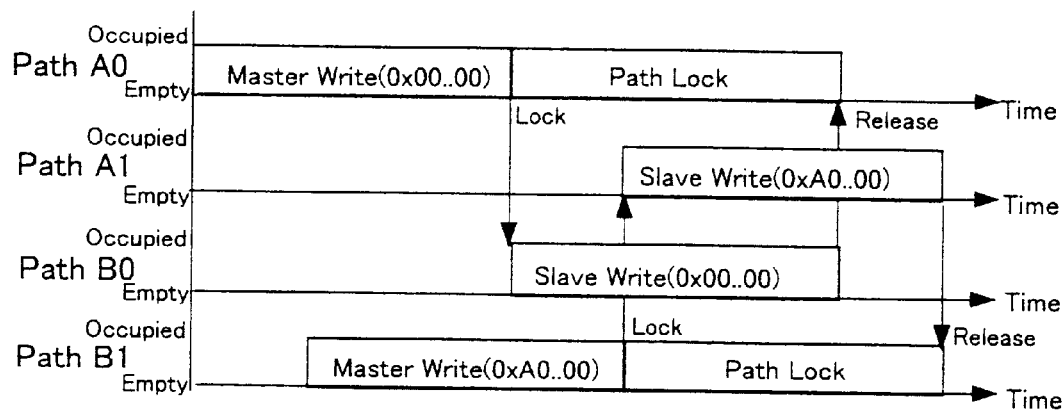
FIG. 4A is a drawing showing dual write performed with good efficiency in the disk array controller of this invention.
Figure 4B:
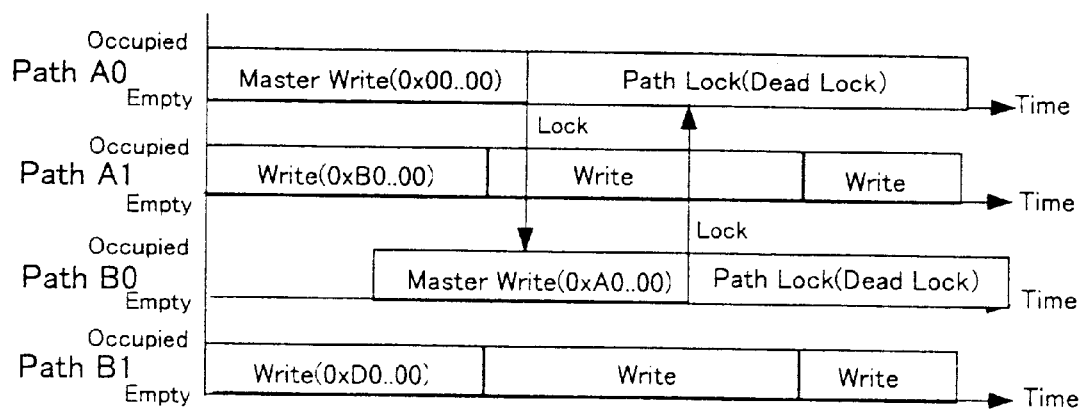
FIG. 4B is a drawing showing an example of deadlock occurring during dual write.

The advantages when the first embodiment of this invention is utilized are shown in FIG. 4. In this example showing efficient dual write processing, when different shared memories are distributed to a master for two dual writes, access can be mostly performed in parallel by selective use of four paths on the master and the slave sides and the number of transactions can be increased. However, as shown in the lower example of deadlock occurring during dual write, when a mistake is made in selecting the paths, the mutually desired paths continued to be occupied and a deadlock occurs, so that processing can no longer proceed. Therefore, selecting a path not having a deadlock is necessary by utilizing the path lock table 31 and the memory lock tables 126, 146.

The path lock table 31 is shown in FIG. 5. Reference numeral 400 is the "Side of Shared Memory", showing the side of the shared memory connected to the path. Reference numeral 405 is the "Occupied Path #" showing what the path number is in the overall system. Reference numeral 410 is the "Path Queue Length" for showing the number of waiting transactions (transactions awaiting processing) in the queue. Reference numeral 415 is the "Dual Access in Queue" for showing whether or not dual writes are contained in the transactions being processed or arrayed in the (waiting) queue. Reference numeral 420 is the "Current Access" in other words, the access type currently being processed and shows whether the access currently being processed is a single read, single write, dual write, atomic modify (read, write) or dual atomic modify (read, write). Reference numeral 425 is the "Current Access is Locked" and shows whether or not the path in the current processing continues to be locked even after read has ended in the processing such as atomic modify. Reference numeral 430 is "Current Access has Master/Slave" showing whether the current processing is master or slave, and whether the access currently in progress is on the master side or the slave side.

The memory lock tables 126 and 146 are shown in FIG. 6. Reference numeral 450 is the "Occupied Path#" showing from what number of path in the overall system that access is being performed. Reference numeral 455 is the "Exclusive Processing Start Address" showing the start (or lead) address of the shared memory being accessed. Reference numeral 460 is the "Exclusive Processing End Address" showing the end (or last) address of the shared memory being accessed. The data range from the Exclusive Processing Start Address 455 to the Exclusive Processing End Address 460 is exclusive of other data so other access cannot be performed. The exclusive data length is set beforehand by the user. Reference numeral 465 is the "Lock Access" for showing a lock access and in the case of a master or atomic modify shows if exclusion (of other access) has not been canceled even after accessing of the shared memories 130, 150 has ended. This lock is canceled by a command from the shared memory path interface 30 after access has completely terminated and the column space for showing "Lock Access" status becomes blank.

Figure 7A:
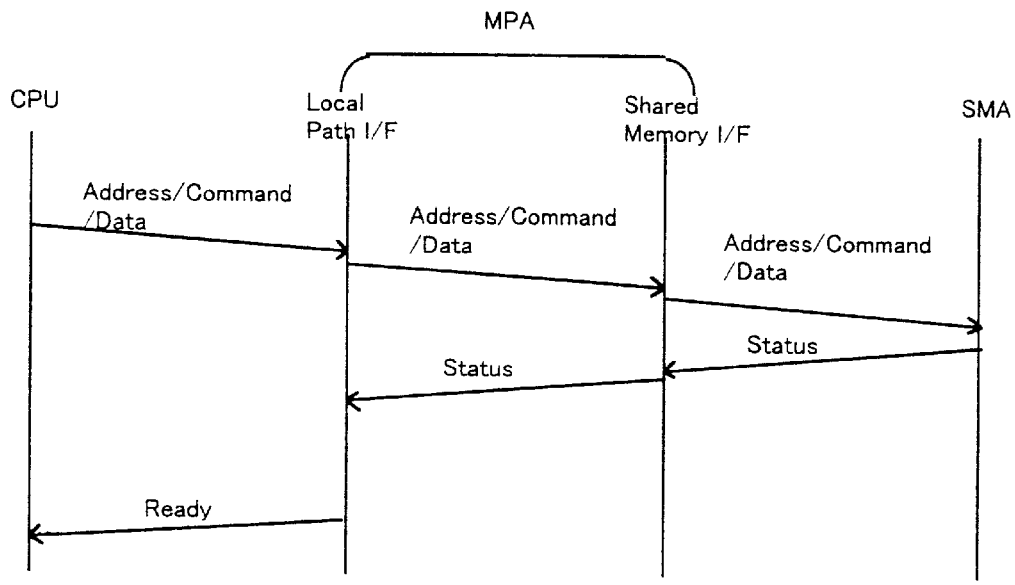
FIG. 7A shows single write operation in the disk array controller of this invention.
Figure 7B:
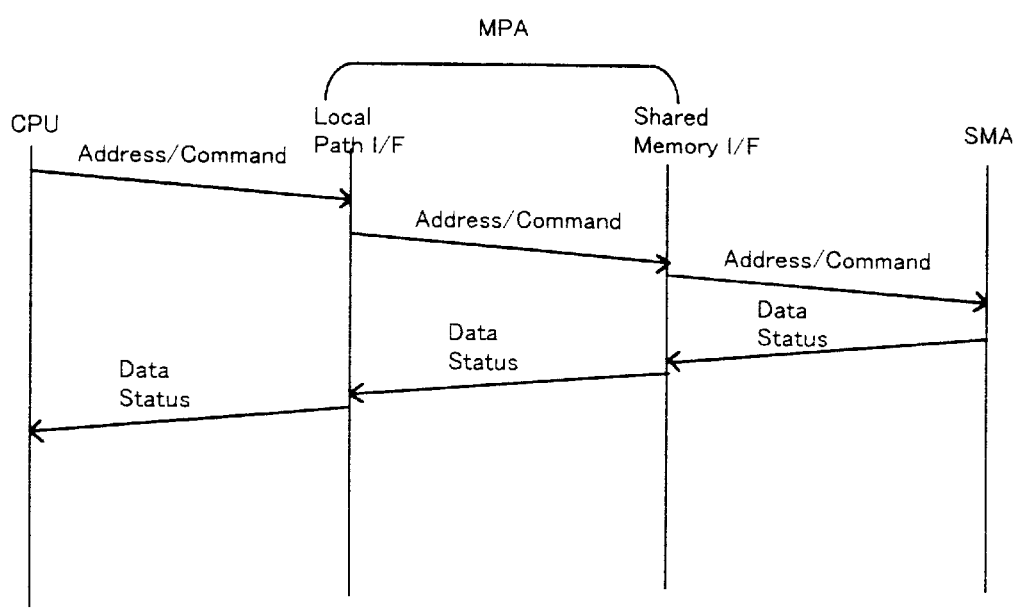
FIG. 7B shows single read operation in the disk array controller of this invention.

FIG. 7A shows single read operation and single write operation in the first embodiment of the disk array controller of this invention. Unless otherwise mentioned, the structure of the example used in FIG. 1 is hereafter described. In the single write operation in FIG. 7A, the addresses, commands and data are sent from the CPU 15 and 18 to the MPA 30 by way of the local path circuit 25, 28, the shared memory Paths 0 (60, 70) or the shared memory Paths 1 (65, 75) are selected from the MPA30 and sent to the shared memory control logic (circuits) 125, 145 of the SMA-PK#A120, and SMA-PK#B140. When the write processing has ended, the end (termination) information holding this status is sent to the MPA30 from the SMA by way of the same shared memory path, and a ready flag showing that the next transmission is possible is returned to the CPU 15, 18 byway of the local path circuits 25 and 28 from the MPA30. In the read operation of FIG. 7B, the address and commands are sent from the CPU15, 18 to the MPA30 by way of the local path circuits 25, 28, the shared memory Paths 0 (60, 70) or the shared memory Paths 1 (65, 75) are selected from the MPA30 and sent to the shared memory control logic (circuits) 125, 145 of the SMA. When the read processing has ended, the data and status is sent to the MPA30 from the SMA shared memory control logic (circuits) 125, 145 by way of the same shared memory path, and the data and ready then returned from the MPA30 to the CPU15, 18. In operation during single read and single write, the MPA30 retains the shared memory path and does not release this path until the status is returned from the SMA-PK#A120 and SMA-PK#B140.

Figure 8:
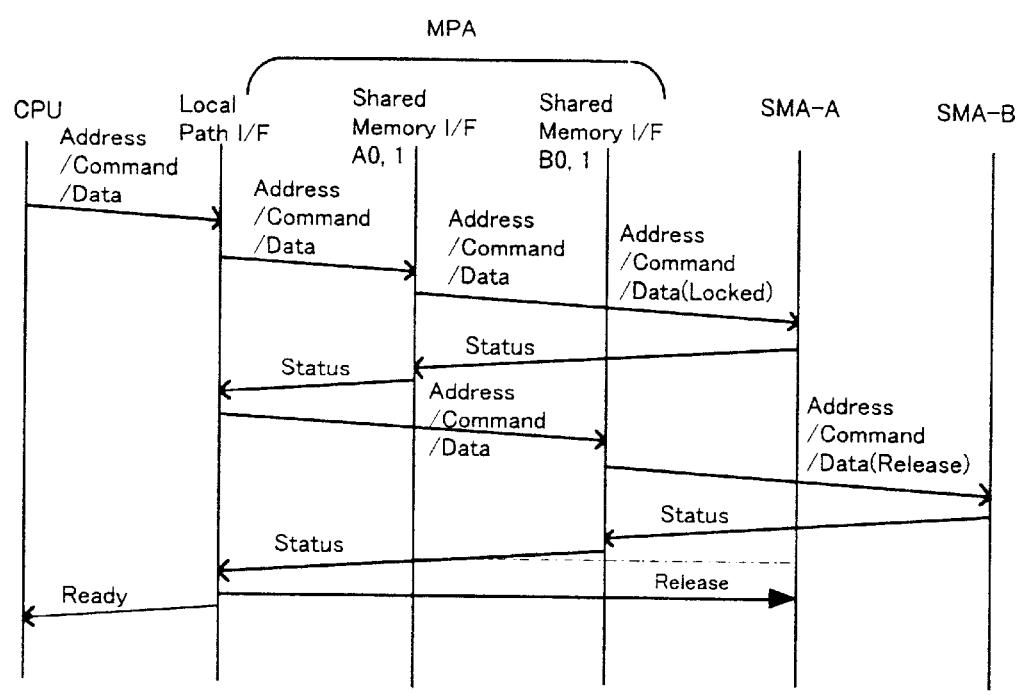
FIG. 8 shows dual write operation in the disk array controller of this invention.

Dual write operation is shown in FIG. 8. From hereon, unless stated otherwise, the description will proceed by taking the A side of the shared memory 130 as the master, however the case where the B side of shared memory 150 is the master is also the same. In dual write operation in FIG. 8, the address, command and data are sent to the MPA30 from the CPU by way of the local path. The shared memory Path 0 (60) or the Path 1 (65) of the side used as the master (A side in the example of FIG. 9) is selected from the MPA and sent to the shared memory control logic circuit A-125 of the SMA-PK#A120. When the write processing has ended, the end (termination) information holding this status is sent to the MPA30 from the shared memory control logic circuit A-125 of the SMA-PK#A120 along the same memory path. Afterwards, the shared memory control logic circuit A-125 still retains the path-on the master side and this path cannot be used for other access. If the status is correct, the MPA30 next selects the Path 0 (70) or the Path 1 (75) of the side (B side in the example of FIG. 9) to be the slave and sends the address, command, and data to the shared memory control logic circuit B-145 of the SMA-PK#B140. When the write processing has ended, the end (termination) information holding this status is sent from the SMA-PK#B140 to the MPA30 along the same shared memory path. The slave side immediately releases the path once transfer is finished.

If the status is normal, an unlock command is sent to the shared memory control logic circuit A-125 to release the path on the master side held by the MPA30, and this path is then released. Next, a ready signal is returned to the CPU15, 18 to show that the next transmission is now possible by way of the local path.

Figure 9A:
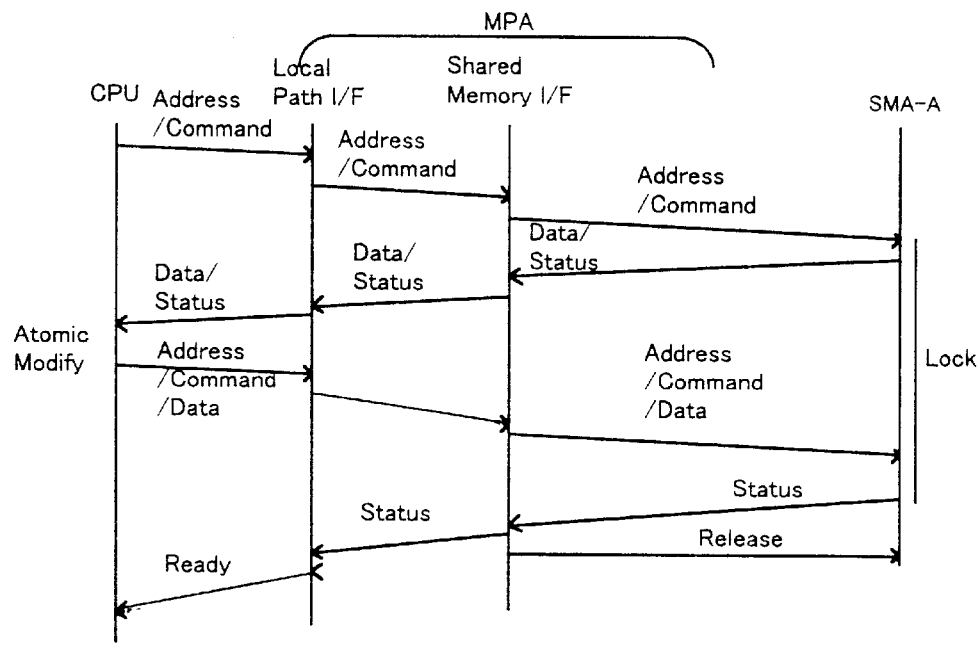
FIG. 9A shows single atomic modify operation in the disk array controller of this invention.
Figure 9B:
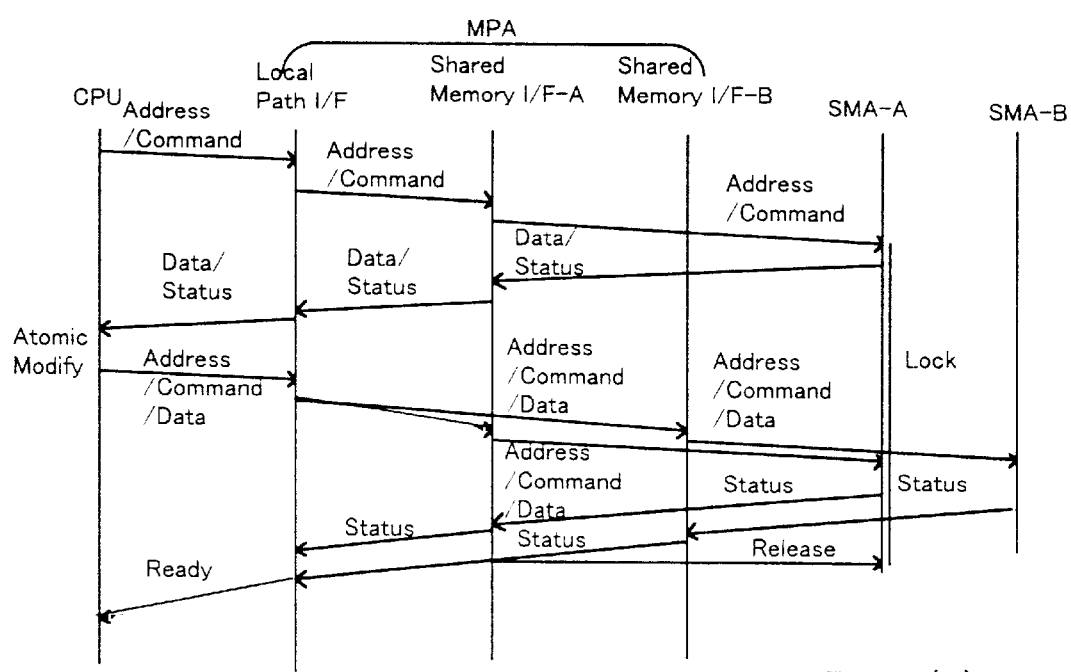
FIG. 9B shows double atomic modify operation in the disk array controller of this invention.

Single atomic modify operation is shown in FIG. 9A and dual atomic modify operation is shown in FIG. 9B. Atomic modify is a process to perform write operation after read of the shared memory without allowing intervention from another access, so that functions such as synchronized multiprocessors are required. In the single atomic modify operation of FIG. 9A, the address and command are sent from the CPU 15, 18 to the MPA30 by way of the local path, the Path 0 (60) or the Path 1 (65) of the shared memory is selected from the MPA30 and sent to the SMA-PK#A120 (in this example, the shared memory control logic circuit A-125). When the read processing has ended, the data and status are sent from the SMA-PK#A120 to the MPA30 along the same shared memory path, and the data and status from the MPA30 is returned to the CPU15, 18. The paths utilized for the read operation are afterwards retained by the shared memory control logic circuit A-125 and this path cannot be used for other access. At normal status, after the CPU15, 18 perform modify processing, the MPA30 next transmits the address, command and data to the shared memory control logic circuit A-125 of the SMA-PK#A120. When the write processing has terminated, the end (or termination) information carrying the status is sent to the MPA30 from the shared memory control logic circuit A-125 of the SMA by way of the same shared memory paths. Also, the path that was locked up until now is simultaneously opened. A ready signal is then returned to the CPU15, 18 from the MPA30 showing that transmission is possible. In the dual atomic modify operation of FIG. 9B, the first half of the read operation is the same as the single atomic modify operation. At normal status, after modify processing was performed by the CPU15, 18, the MPA30 performs dual write of the master side of shared memory 130 whose paths were already secured and the slave side of shared memory 150 whose paths are not secured. The address, command and data from the MPA30 are sent, using the master side, to the shared memory control logic circuit A-125 of the SMA-PK#A120. When the write processing has ended, the end (or termination) information holding the status is sent from the SMA shared memory control circuit to the MPA30 by way of the same shared memory path. On the slave side, the Path 0 (70) or the Path 1 (75) are selected, and the address, command and data sent to the shared memory control logic circuit B-145 of the SMA-PK#B. When the write processing had ended, the end (or termination) information holding the status is sent from the SMA-PK#B to the MPA30 by way of the same shared memory path. The path on the slave side is opened immediately after transfer is finished. If the status is correct, an unlock command is sent to the shared memory control logic circuit A-125 to release the path on the master side held by the MPA30, and the master side path is released. Next, a ready signal is returned to the CPU15, 18 to show that the next transmission is possible by way of the local path. A processing flow such as described below is necessary for implementing each access as shown in FIG. 7, 8, 9, for the shared memory path interface (MPA) 30, the shared memory control logic circuit A (SMA-A) 125, and the shared memory control logic circuit B (SMA-B) 145.

Figure 10:
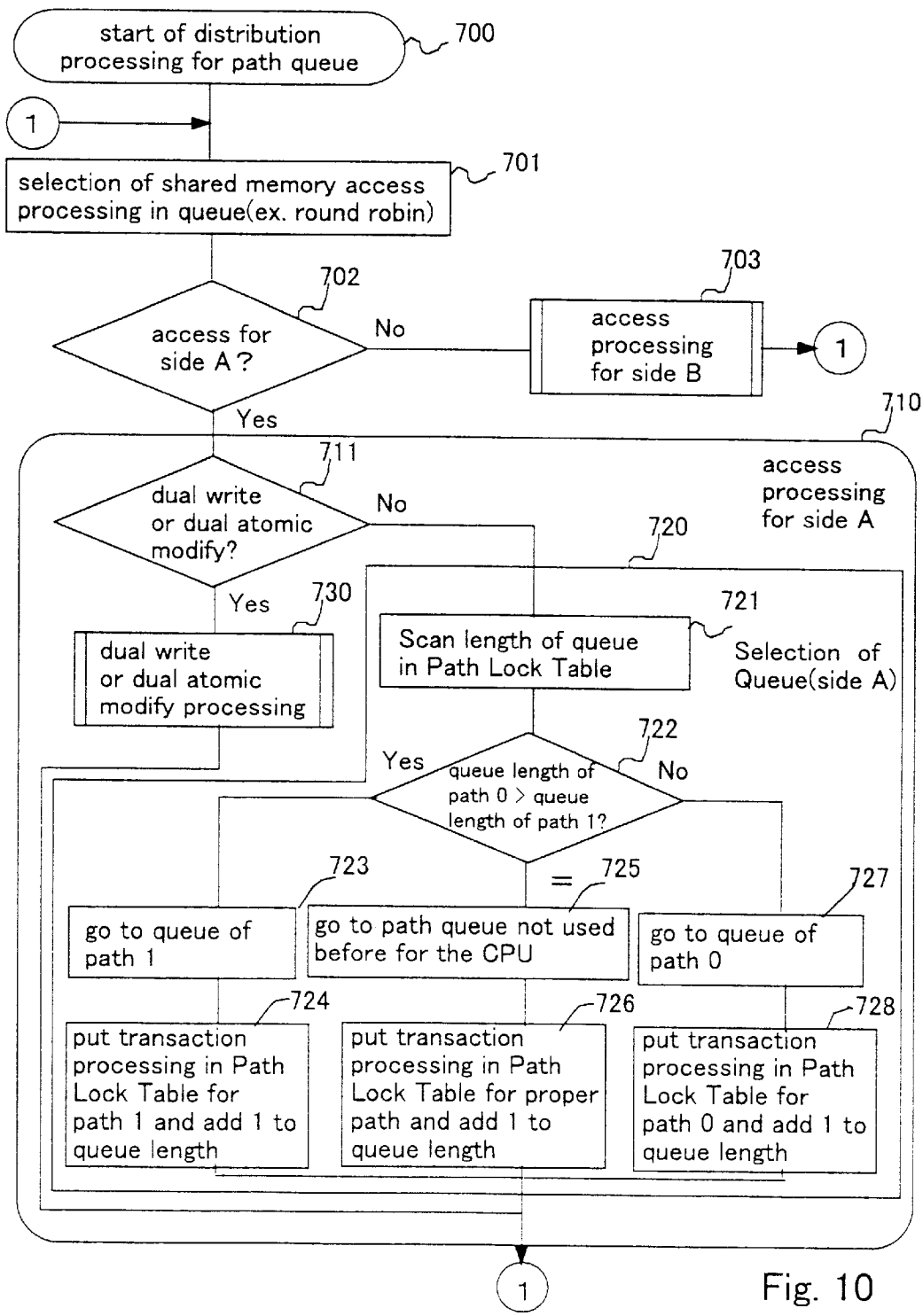
FIG. 10 is a flowchart showing the path queue distribution processing in the disk array controller of this invention.

The path queue distribution processing flow is shown in FIG. 10. Here, the flow is from the shared memory path interface (MPA) 30 receiving the transaction from the CPU15, 18 up to loading in each path queue of the MPA30. The path queue distribution processing starts from step 700. In step 701, an order of priority is established for the plurality of processing coming from the CPU15, 18 using a format such, as a round robin and processing having the highest order of priority is selected. In step 702, a determination as to whether that processing starts from the SMA-PK#A120 (A side) is made. If the processing started from the SMA-PK#B120 (B side) then the operation flow proceeds to the access processing of step 703. If the processing starts from the A side, then the operation flow proceeds to the access processing of step 710.

Here, excluding differences in the A side and B side, the processing of step 703 and step 710 is completely the same. In step 711, a check is made to find if the processing is dual write or dual atomic modify. If the processing is dual write or dual atomic modify, then the process proceeds to the dual write or the dual atomic modify of step 730. Step 730 is explained later. If the processing is neither dual write nor dual atomic modify, then the operation proceeds to the queue selection processing of step 720. In step 721 inside step 720, the A side of the path queue length 410 of the path lock table 31 inside the MPA30 is checked. In step 722, the path queue lengths 410 of the path 0 (60) and the path 1 (65) are compared. If path 0 (60) is longer, then the operation proceeds to step 723, and processing begun on path queue 1. The process next proceeds to step 724, a 1 is added to the path 1 queue length inside the path lock table 31 and the process registered. If path 1 (65) is longer, then the operation proceeds to step 727 and the processing begun on path queue 0. The process next proceeds to step 727, a 1 is added to the path 1 queue length inside the path lock table 31 and the process registered. If both paths are the same, then the operation proceeds to step 725, and processing begun on the path queue not used before by the CPU. The operation next proceeds to step 728, a 1 is added to the applicable path queue length 1 inside the path lock table 31 and the process registered. After the steps 723, 726, 728, the operation returns to step 701. The operation also returns in the same way to step 701 after the access processing of the B side of step 703 has ended (or terminated). Control is performed by means of the above queue selection processing 710 so that the processing of CPU15, 18 utilize the shorter of the two queue length paths, to improve path utilization efficiency.

Figure 11:
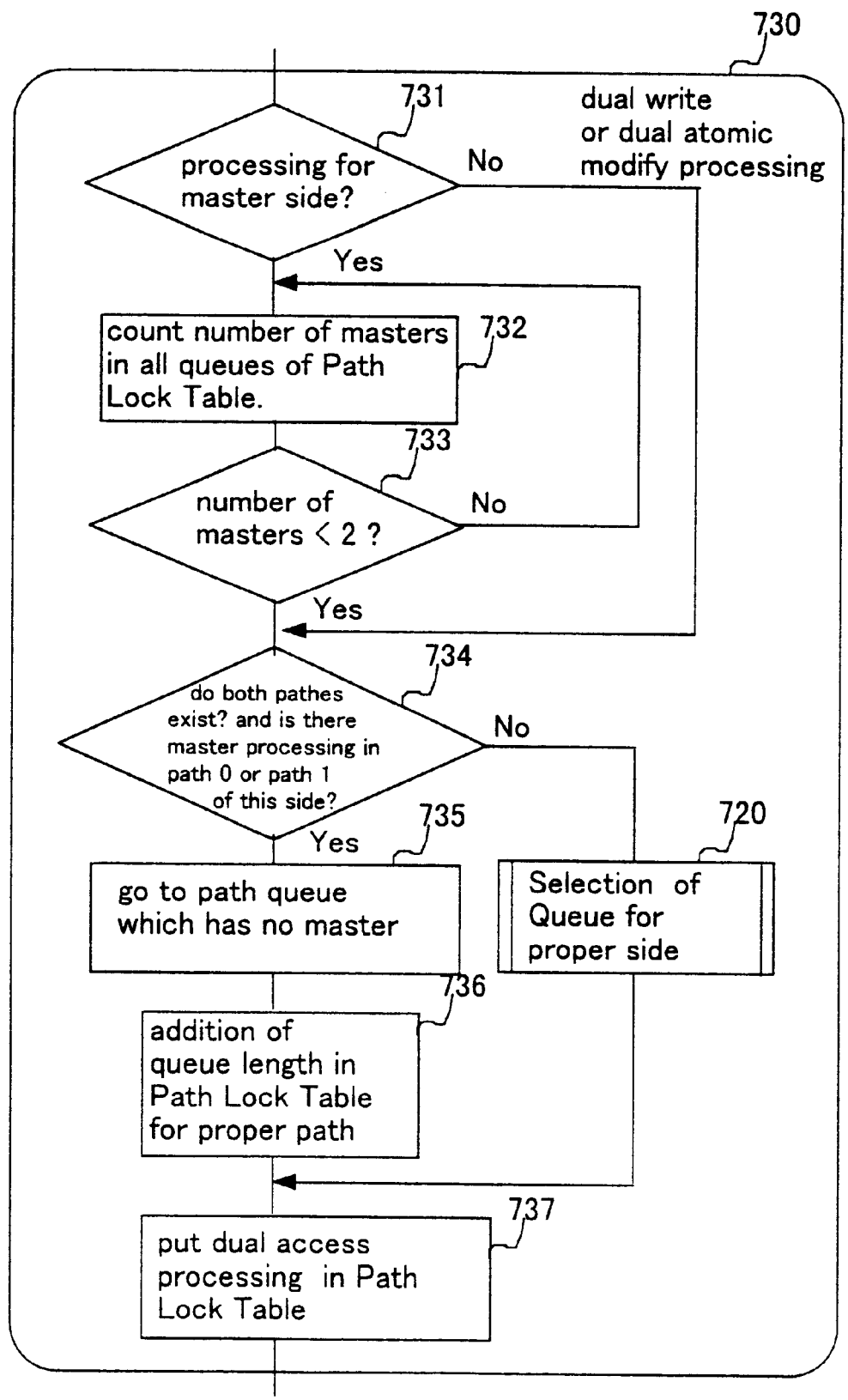
FIG. 11 is flowchart showing the dual write and atomic modify processing flow in the disk array controller of this invention.

The flow of dual write and dual atomic modify processing is shown in FIG. 11. In Step 731 a check is made as to whether or not the access is master side processing. If found to be processing for the slave side, then the operation proceeds to step 734. If found to be processing for the master side, then the operation proceeds to step 732, a check is made for dual access 415 (Dual Access in Queue) inside the queue of the path lock table 31 and the presence or absence of a master/slave 430 (Current Access has Master/Slave) in the processing, and the number of master side and dual atomic modifies are counted. A check is made in step 733 as to whether the number of masters is less than two. If found to be two or more, then processing for two or more masters is in progress and processing of dual write or dual atomic modify in excess of this is impossible. The operation therefore returns to step 732 and waits until the master count is less than one. When the number of masters becomes less than one, then the operation proceeds to step 734. In step 734, a check is made by means of the path lock table 31 as to whether the two paths for access of the shared memory side are normal (applicable side) and also if either side has master side processing. If master side processing is present on either side then the operation proceeds to step 735 and processing started on the path where there is no master processing. The operation next proceeds to step 736, a one (1) added to the applicable path of the path queue length 410 inside the path lock table 31 and the operation proceeds to step 737. If neither is a master, then the operation proceeds to step 720, queue selection is performed, the path for use secured, and the operation proceeds to step 737. In step 737, the dual access 415 inside the queue of the path lock table is registered. By using the dual write, dual atomic modify processing 730 to secure the paths, access for dual write and dual atomic modify can be distributed to the optimal queue without the possibility of a deadlock.

Figure 12:
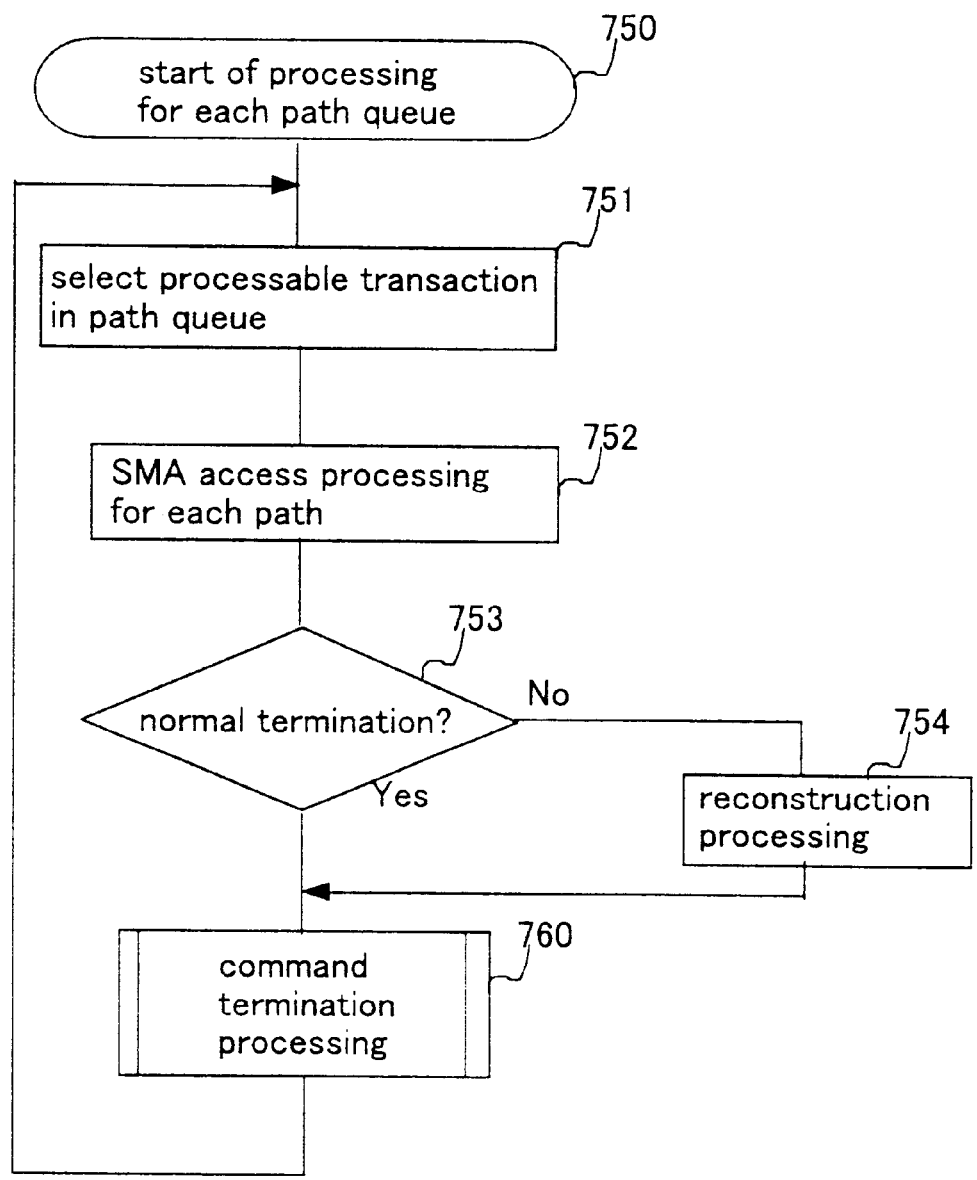
FIG. 12 is flowchart showing the path queue processing flow in the disk array controller of this invention.

The path queue processing flow is shown in FIG. 12. Here, the transaction in each queue is sent to the SMA-PK#A120 and SMA-PK#B140 by way of each path and if a reply occurs, is then returned to CPU15, 18 for processing. Processing of each path queue starts from step 750. In step 751, transactions capable of being implemented are extracted from the path queue. In step 752, SMA accessing is performed on each path for the transaction that was extracted. The SMA access processing issues a command for the protocol such as in FIG. 7, 8, and 9 and receives the data and status, etc. In step 753, a check is made as to whether or not the returned status is normal. If the status ended (or terminated) normally, the operation proceeds to the command termination processing of step 760. If the status did not terminate normally then the reconstruction processing of step 754 is performed and the operation proceeds to step 760.

The details of the reconstruction processing are not directly related to this invention so a further description is omitted. Path reconstruction processing is however described later on. The command termination processing of step 760 is described later on. The operation returns to step 751 when the command termination processing of step 760 has ended.

The command termination processing is shown in FIG. 13. After the SMA access processing has ended, the current address (type) 420, the current access is locked 425 and the current access has master/slave 430 of the path lock table 31 are checked and the next processing to be performed is selected according to their particular combination, in the command termination processing 760. The following processing to be performed is necessary in order to achieve the protocol of FIG. 7, 8 and 9.

The processing of FIGS. 10, 11, 12 described above, is performed in the MPA 30. Commands issued from the MPA30 are sent to the SMA-PK#A120 and SMA-PK#B140 and processing performed.

Figure 14:
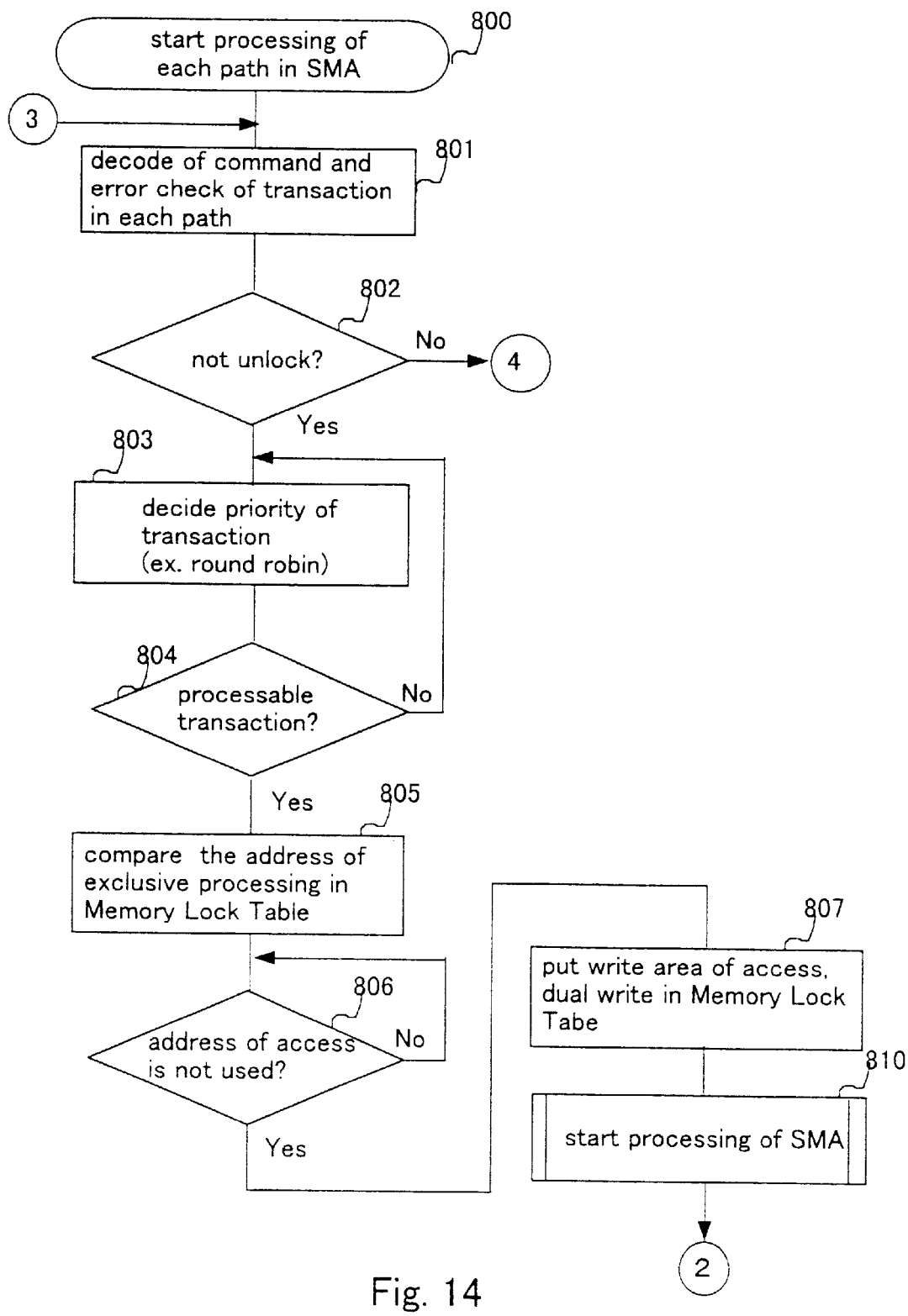
FIG. 14 is flowchart showing the path processing flow in the SMA in the disk array controller of this invention.

The flow of the path processing inside each SMA is shown in FIG. 14. In this process flow, a memory lock is performed with an order of priority assigned for transactions from each path that arrived at the SMA-PK#A120 and SMA-PK#B140, access processing of the shared memory is implemented, and then a termination report issued to the MPA30 for performing termination processing. Processing of each path inside the SMA starts from step 800. Decoding and error checks are performed in step 801 on the transaction arriving from each path. A determination is made in step 802 as to whether the final dual write or atomic modify of the transaction that arrived is an unlock or not. If not an unlock, then the operation proceeds to step S803. If an unlock, then the operation proceeds to 4 of FIG. 15. In step 803, the order for implementing the transaction that arrived on each path is determined by a round robin, etc. In step 804 a determination is made as to whether or not the transaction on each path can implement the result of the round robin. If the round robin result cannot be implemented, the operation returns once again to step 803. If the round robin result can be implemented then the operation returns to step 805, the memory lock table 126 and 146, the exclusive start address 455 and the exclusive end address 460 are referred to, and a search made to find whether or not there is an overlap with addresses already in exclusive processing. If the address overlaps, then a lock is established on that area. In step 806 a determination is made as to whether the access destination from the search results is an unlocked area. If a locked area, then operation waits until the lock is released. If an unlocked area, then the operation proceeds to step 807 and the access range shown by the exclusive start address 455 and the exclusive end address 460 as well as the prescence or absence of a lock access are registered in the memory lock tables 126, 146. Afterwards, in step 810, access processing of the shared memory is performed, and read and write processing of the shared memories 130, 150 performed. The operation flow when the processing of the shared memories 130, 150 is complete is shown from 2 onwards in FIG. 14 and FIG. 15.

Figure 15:
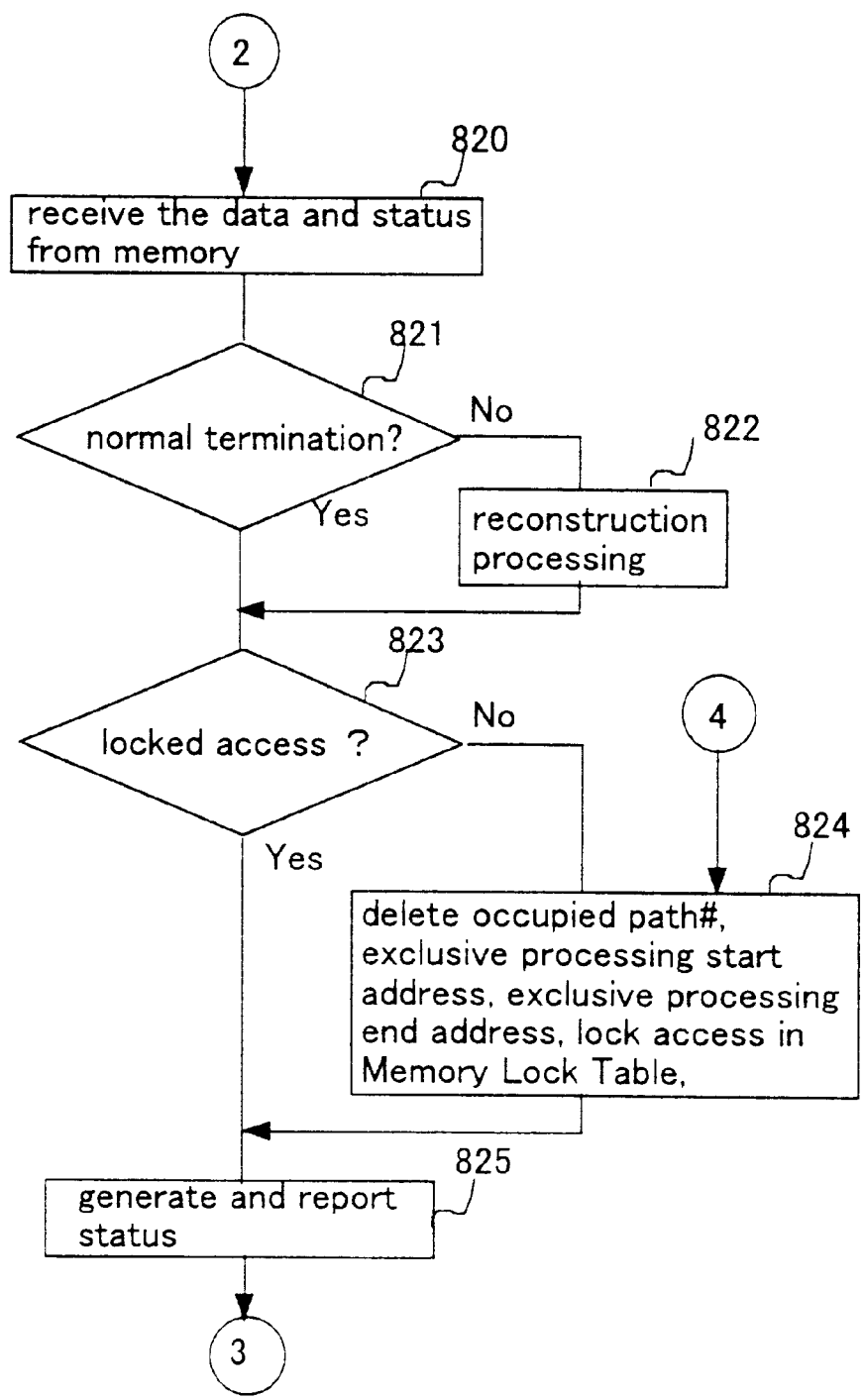
FIG. 15 is flowchart showing the (continuation of) path processing flow in the SMA in the disk array controller of this invention.

A continuation of the operation flow of the path processing inside the SMA is shown in FIG. 15. In step 802, the data and status is received from the shared memories 130, 150. In step 821, a determination is made from the data and status as to whether the processing terminated normally. If the processing terminated normally, then the operation proceeds to step 823. If an abnormal termination, the reconstruction processing of step 822 is performed and the operation proceeds to step 823. The details of this reconstruction processing are not directly related this invention so a further description is omitted. In step 823, a determination is made as to whether or not the terminated processing is lock access processing. If a lock access, then the memory and path are left locked and the operation proceeds to step 825. If not a lock access, then the operation proceeds to step 824, and the Occupied Path# 450, the Exclusive Processing Start Address 455, the Exclusive Processing End Address 460 and the Lock Access 465 registered in the memory lock tables 126, 146 are deleted. The operation then proceeds to step 825. In step 825, a status for normal termination or abnormal termination of the processing is generated, and sent to the MPA30.

Figure 16:
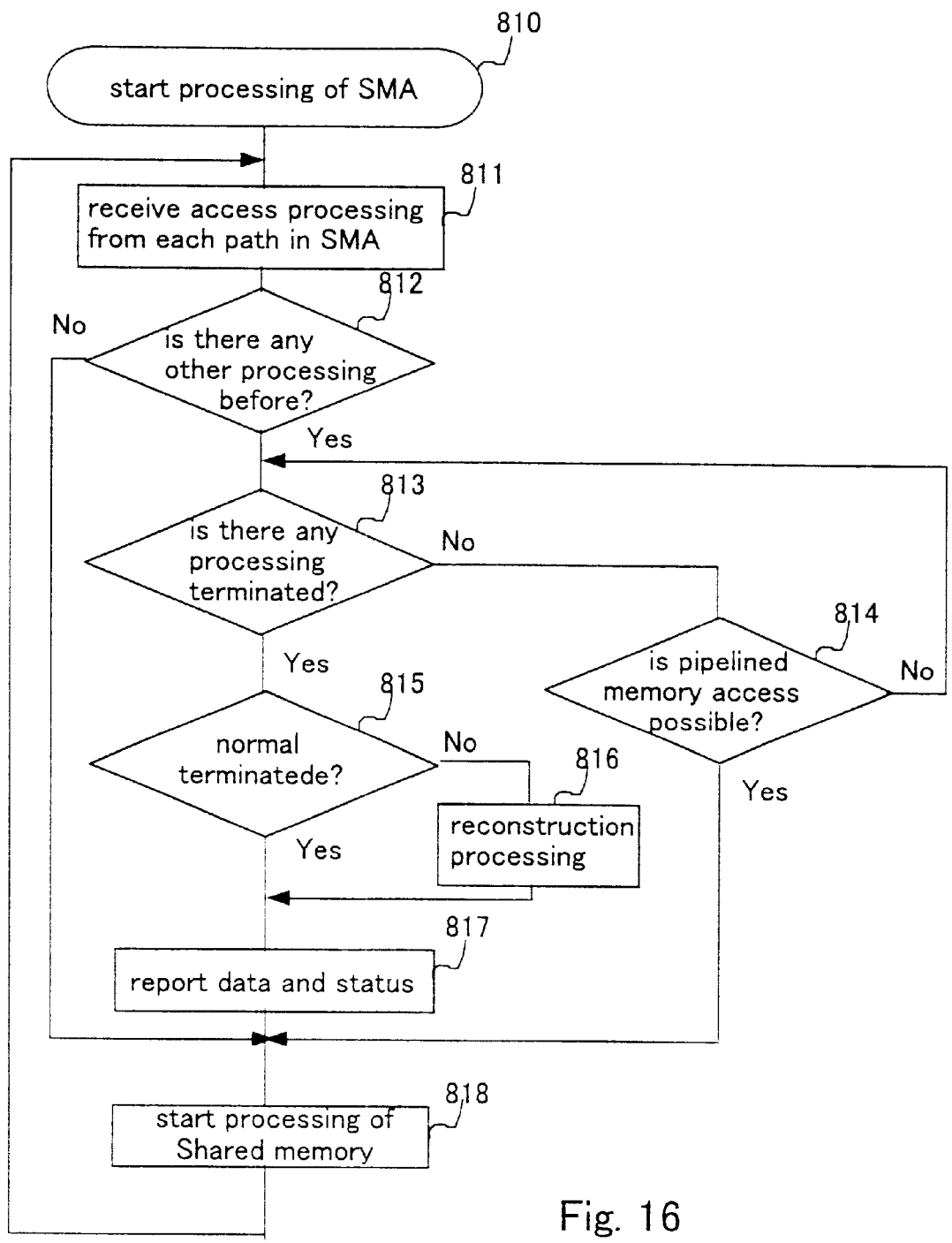
FIG. 16 is a flowchart showing the access processing flow in the shared memory in the disk array controller of this invention.

The flow for access processing of the shared memory is shown in FIG. 16. The access processing of the shared memory starts from step 810. The memory access transaction is received from each path in the SMA in step 811. In step 812, a determination is made as to whether this access is the leading transaction or not. If not, then the operation proceeds to step 818, If the leading transaction, then the operation proceeds to step 813 and a determination made as to whether the access is a terminating process. If not, then the operation proceeds to step 814 and a determination made as to whether memory multi-access is possible or not. If not possible, then the operation returns unchanged to step 813. If possible, then the operation proceeds to step 818. If the access is termination processing, then the operation proceeds to step 815 and a determination made as to whether or not the access is a normal terminating process. If a normal terminating process, the operation proceeds to step 817. If an abnormal termination, then the reconstruction processing of step 816 is performed and the operation proceeds to step 817. The details of this reconstruction processing are not directly related this invention so a further description is omitted. In step 817, a status for normal termination or abnormal termination of the processing is generated, and sent to the MPA30. The actual read and write processing of the shared memory is implemented in step 818. Afterwards, the operation returns to step 811.

Therefore, as shown in FIG. 10 through FIG. 16, data mismatches or deadlocks can be eliminated during dual write and path selection performed with good efficiency by implementing the processing flow of the SMA-PK#A130, SMA-PK#B150 and the MPA30. Reliability can be improved and duplication of paths can be achieved by performing the reconstruction processing such as shown in FIG. 17.

Figure 17:
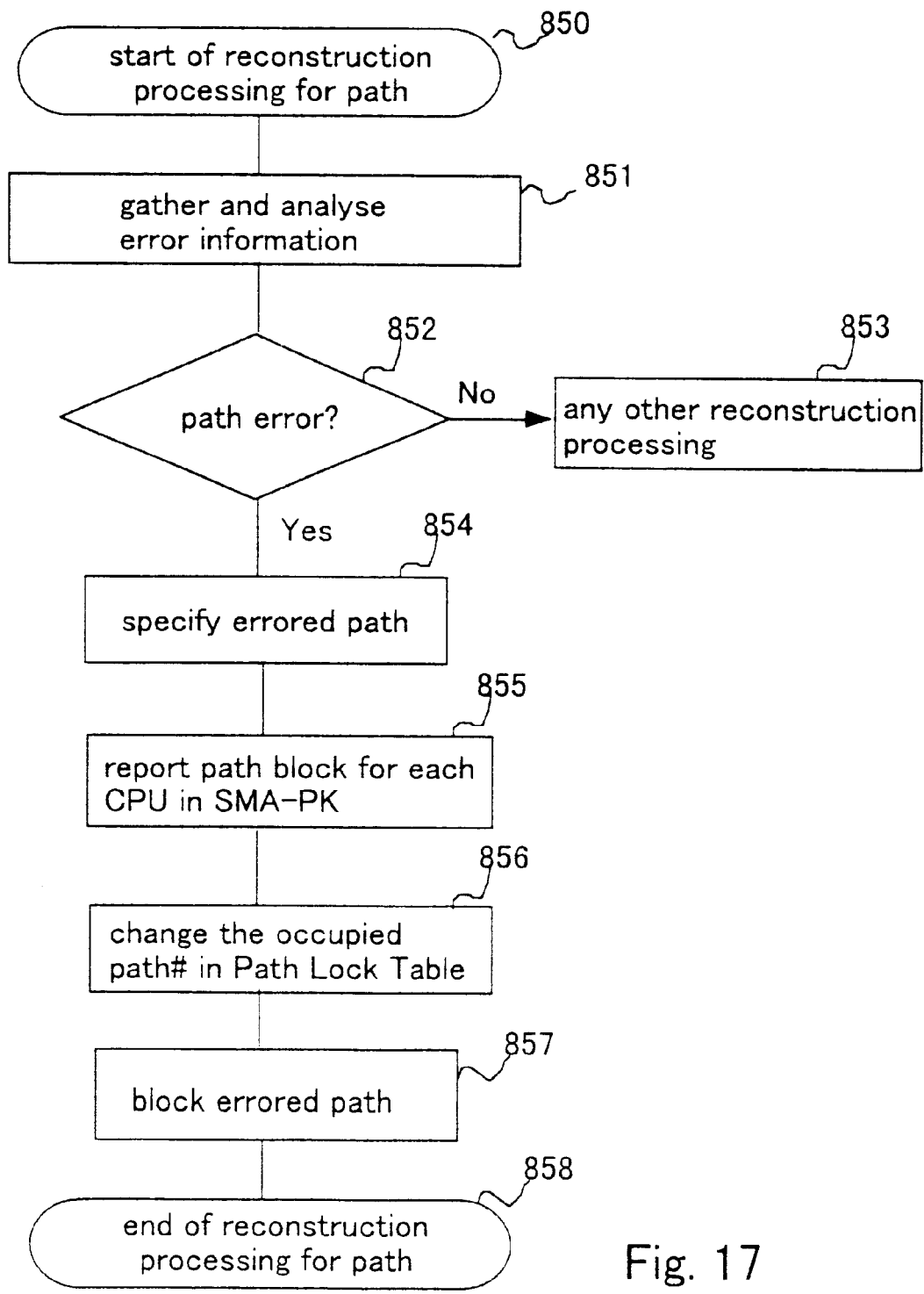
FIG. 17 is a flowchart showing the reconstruction processing flow in the shared memory in the disk array controller of this invention.

The path reconstruction processing flow in the first embodiment of this invention is shown in FIG. 17. The path reconstruction processing starts from step 850. In step 851, error information is gathered and analyzed from the status. In step 852, whether or not a path error is present is determined. If not found to be a path error, then other reconstruction processing is performed. If a path error is present, then the operation proceeds to step 854 and the path with the error is specified. In step 855, a report is issued on a path block for the CPU15, 18, the SMA-PK#A130, and the SMA-PK#B150 using the path with the error. In step 856, the occupied path # in the path lock table 31 is changed. In step 857, a physical and logic block of the error path is performed. In step 858, the path reconstruction processing is terminated.

In the first embodiment of this invention as shown above in FIG. 1 through FIG. 17, in a duplicated shared memory controller connected by a star connection to a duplicated path, a path lock table is held on the interface side of the shared memory, and a memory lock table is held on the shared memory control circuit side. By selecting the path while referring to the path lock table and memory lock table, not only single type access paths but path selection for dual write, dual atomic modify can be efficiently performed without deadlocks, so that the processing wait time for a transaction can be shortened, and the number of processable transactions can be increased.

Second Embodiment

Another embodiment of the disk array controller of this invention is described next. Portions of the embodiment hereafter, not having a particular explanation are identical to the first embodiment.

Figure 18:
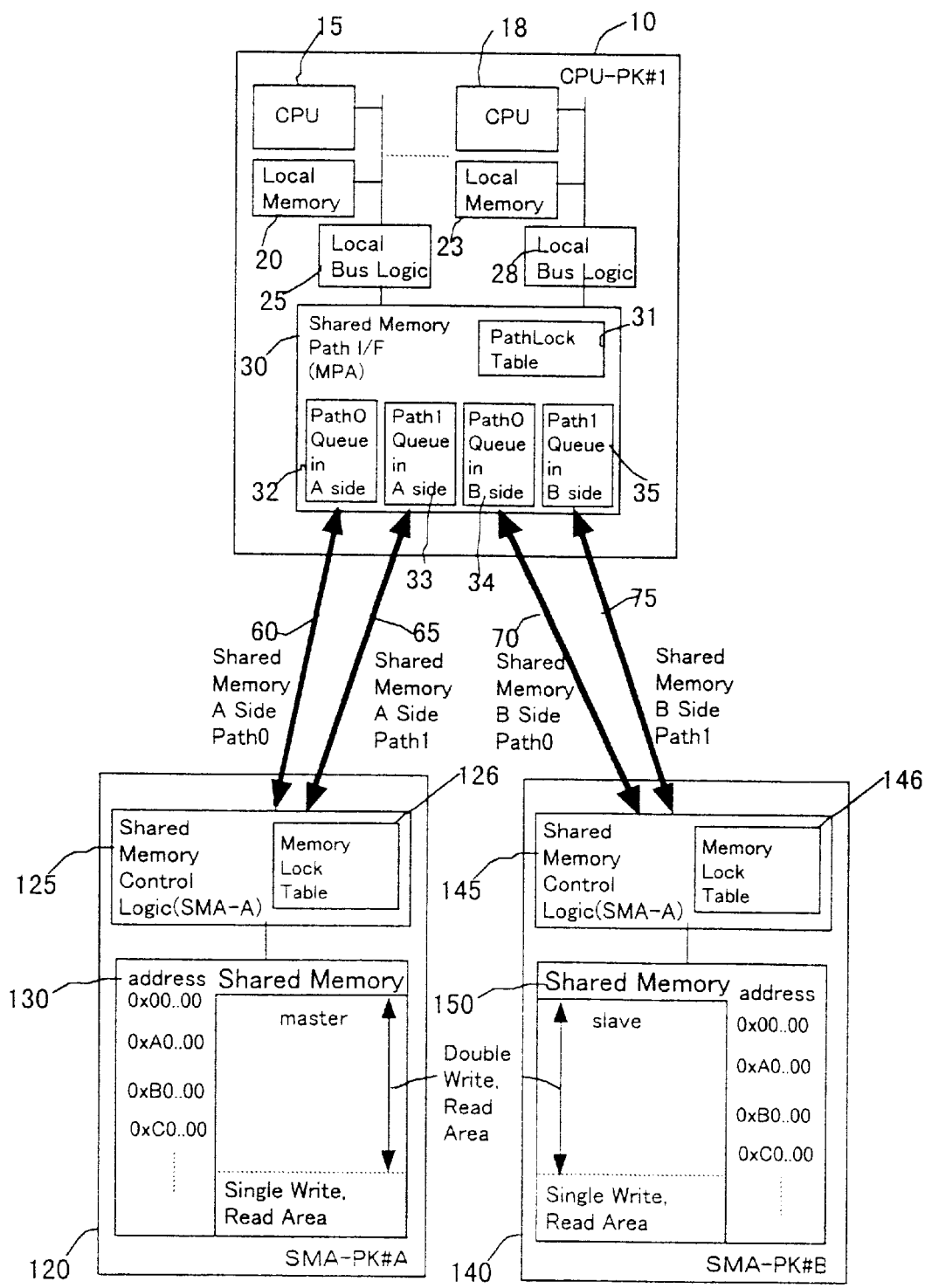
FIG. 18 is a block diagram showing the basic structure of the disk array controller of this invention.

The basic structure of this embodiment is shown in FIG. 18. Here, the portion differing from the first embodiment is the method for positioning the master/slave in the shared memories 130, 150. In the second embodiment, both sides of the shared memories 120, 140 are the master side. A path selection of dual write or atomic modify will therefore always start from the side of a shared memory that is the master side so that the possibility of a deadlock is eliminated and control is easily performed. However, all access here is performed by serial processing so that the increase in the number of transactions is small compared to the first embodiment.

Figure 19:
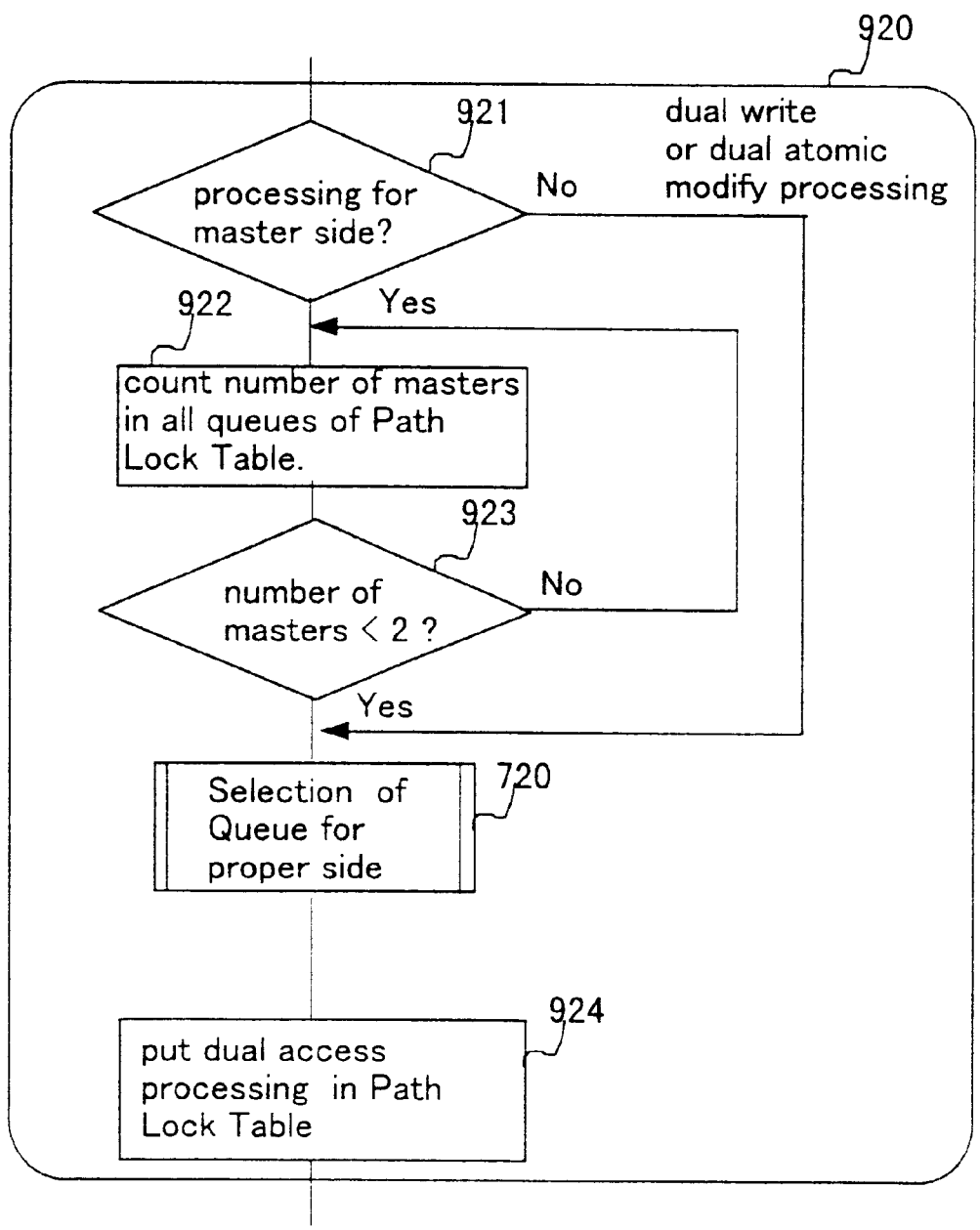
FIG. 19 is a flowchart showing the dual write and dual atomic modify processing flow in the disk array controller of this invention.

The processing flow of dual write and dual atomic modify in the second embodiment of this invention is shown in FIG. 19. This portion corresponds to the dual write, dual atomic modify processing 730 of FIG. 11. In step 921, a check is made as to whether or not the processing is for the access master side. If the processing is for the slave side, then the operation proceeds to step 924. If the processing is for the master side, then the operation proceeds to step 922 and the number of master processes (transactions) within all queues is counted per the path lock table 31. In step 923, a check is made as to whether the number of master processes (transactions) is less than two. If 2 or more, then no more dual write or dual atomic modify processes can be handled, so the operation returns to step 922 and (waits) stands by. If the number of master transactions is less than 2, then processing is allowed so the operation proceeds to the queue selection of step 721. In step 924, the same as in step 737, the dual access 415 inside the queue of the path lock table 31 is registered.

Cases such as the above had the disadvantage that extra processing time was required for dual write but if a write method without such problems could be achieved even if the order of master/slave was interchanged during dual write, such as by controlling the dual write order inside the CPU 15, 18 microprogram, then the time required for dual write could be reduced. Utilizing a dual write method such as shown below, that ignores the write order (sequence) can achieve the desired effect of reducing the dual write processing time.

Figure 20:
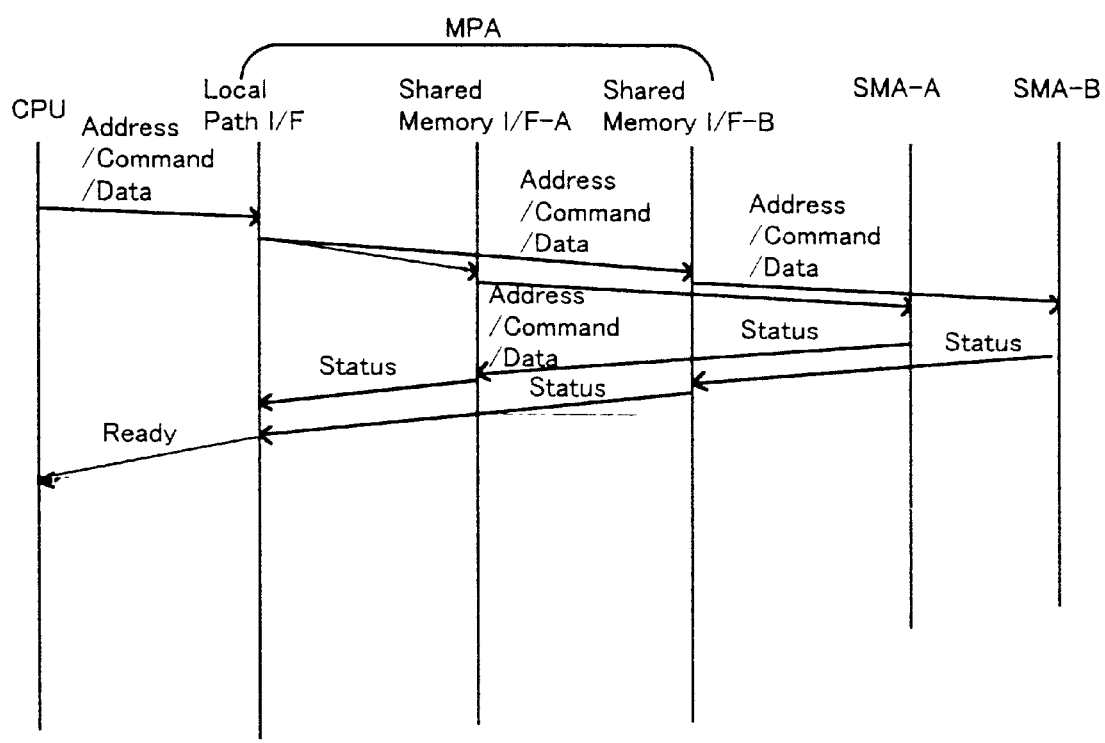
FIG. 20 shows dual write operation which ignores the sequence of master and slave.
Figure 21:
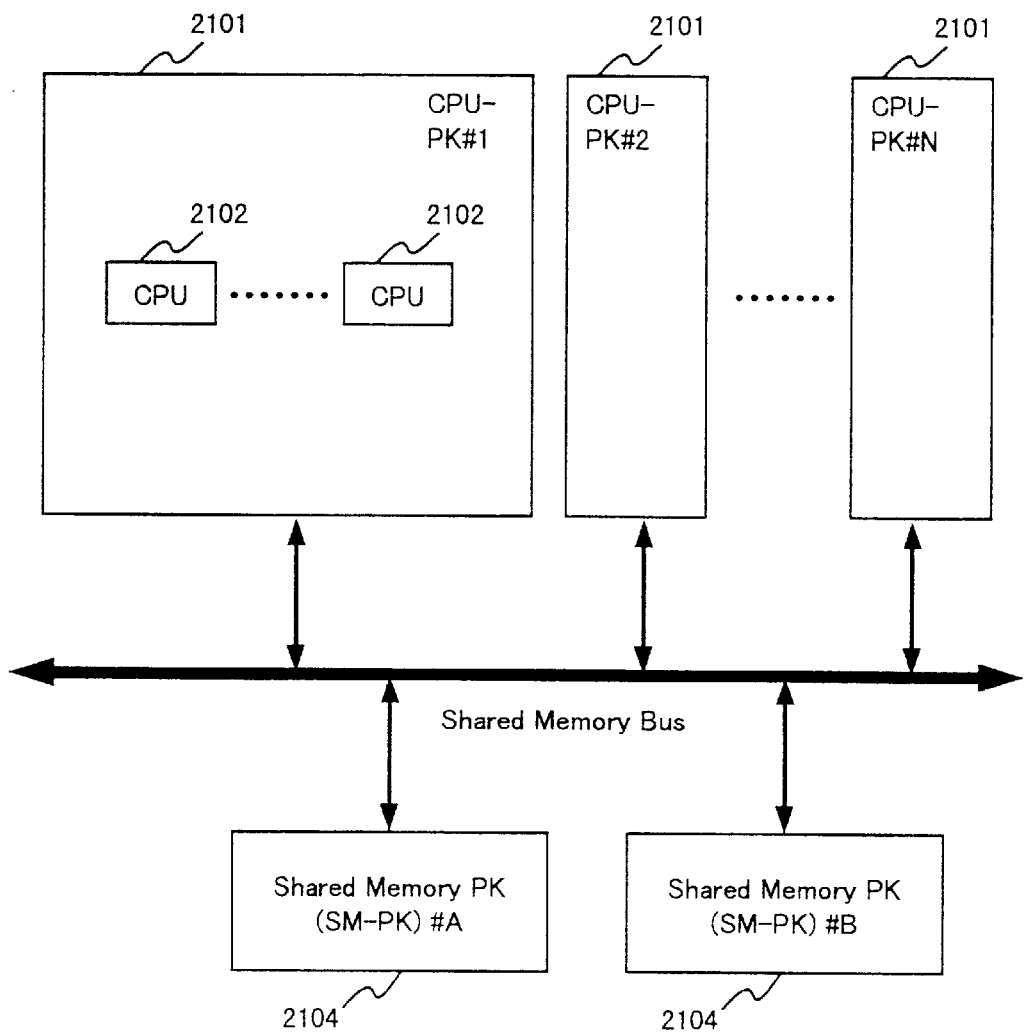
FIG. 21 shows a disk array controller of the prior art.

A dual write method of the second embodiment of this invention that ignores the write sequence is shown in FIG. 20. Here, writing sent from the MPA30 is simultaneously generated for the master side and for the slave side, and no path lock performed, so response time can be reduced.

In the dual disk controller connected by a star connection with a duplicated path, in the second embodiment shown from FIG. 18 to FIG. 20, the shared memory path interface side holds a path lock table and the shared memory control side holds a memory lock table and by by selecting a path while referring to this path lock table and memory lock table, the processing wait (standby) time required for single read, single write and single read modify write can be reduced and the number of processable transactions can be increased.

The above embodiment was described by using a disk array controller but the above described shared memory device is also applicable to systems requiring high reliability and high performance during transactions; and more specifically is also applicable to fault tolerant computers.

In this invention as described above, during processing other than dual write (such as single read, single write, atomic modify) a path with a small number of waiting transactions (transactions awaiting processing) is selected by referring to a path lock table showing the occupied path status; and during dual write or dual atomic modify, a path is selected by referring to a path lock table and dual processing then started if the number of dual write transactions already being processed is within a specified figure; and further, when selecting a dual write path, a path different from the path already being used for dual write processing is selected so that data mismatches and deadlocks are eliminated, a path with good efficiency can be selected, the time for awaiting processing can be reduced and the number of processable transactions can be increased. Also, the shared memory paths are duplicated so that access to the shared memory is still possible even if an error occurs on one path, and reliability is therefore increased.

What is claimed is:
1. A disk controller comprising:
   a plurality of interfaces with respective processors for connecting to a host computer or disk devices;
   duplicated shared memories for respectively storing control information and connected in a one to one ratio between each of said interfaces by means of respective access paths;
   a selector connected to said interfaces;
   a cache memory connected to said selector;
   wherein the number of access paths between said selector and said interfaces is greater than the number of access paths between said cache memory and said selector, and each of said processors performs dual writing in said duplicated shared memories.
2. A disk controller comprising:
   a plurality of interfaces with respective processors for connecting to a host computer or disk devices; and
   duplicated shared memories in which duplicated control information is stored and connected in a one to one ratio by means of respective duplicated access paths between each of said interfaces;
   wherein each of said interfaces transmits data corresponding to a dual write request to each of the duplicated shared memories alternately when each of said interfaces receives the dual write request from said processor inside said interface.
3. A disk controller according to claim 2, wherein each of said interfaces transmits first data corresponding to a first dual write request from said processor to one side of the duplicated shared memory and said first data to another side of the duplicated shared memory, and
   wherein each of said interfaces transmits second data corresponding to a second dual write request from said processor to said another side of the duplicated shared memory and said second data to said one side of the duplicated shared memory.
4. A disk controller according to claim 3, wherein each of said interfaces transmits in parallel said first data and said second data to said one side of the duplicated shared memory and said another side of the duplicated shared memory respectively.
5. A disk controller according to claim 2, wherein each of said interfaces has a plurality of queues corresponding to each of said duplicated access paths, and
   each of said interfaces selects one of said duplicated access paths according to the number of queued transactions awaiting processing in said plurality of queues.
6. A disk controller according to claim 5, wherein
   each of said interfaces selects one of said duplicated access paths having a fewer number of queued transactions awaiting processing in said corresponding queue than in said queue corresponding to another of said duplicated access paths.
7. A disk controller according to claim 5, wherein each of said interfaces controls whether or not to perform queuing in said queue at the next processing request, according to the number of queued dual write or dual atomic modify transactions awaiting processing in said queue.
8. A disk controller according to claim 7, wherein each of said interfaces performs queuing the next processing request in queues which do not have said dual write and said dual atomic modify transactions inside, when the number of said dual write and said dual atomic modify transactions inside said queue or in non-used queues at the next processing request is less than a specified number.
9. A disk controller according to claim 2 wherein, when a failure occurs in one of said duplicated paths, the processing is allocated to another path of said duplicated paths.

* * * * *